United States Patent

Favre

[15] 3,662,237
[45] May 9, 1972

[54] COMMUTATED MOTOR INCLUDING COMMUTATION MEANS RESPONSIVE TO REACTIVE VOLTAGE INDUCED IN ARMATURE WINDINGS

[72] Inventor: Robert Favre, Servan 36, Lausanne, Switzerland

[22] Filed: May 28, 1970

[21] Appl. No.: 41,331

Related U.S. Application Data

[63] Continuation-in-part of Ser. No. 682,176, Nov. 13, 1967, abandoned.

[30] Foreign Application Priority Data

Nov. 11, 1966 Switzerland ..................... 16307/66
Dec. 16, 1966 Switzerland ..................... 18207/66

[52] U.S. Cl. .................................. 318/254, 318/138
[51] Int. Cl. ................................................ H02k 29/00
[58] Field of Search ............ 318/254, 138, 696, 685, 439

[56] References Cited

UNITED STATES PATENTS

| | | | |
|---|---|---|---|
| 3,274,471 | 9/1966 | Moczala | 318/254 |
| 3,304,481 | 2/1967 | Saussele | 318/138 |
| 3,329,852 | 7/1967 | Saussele et al. | 318/138 |
| 3,440,506 | 4/1969 | Krestel et al. | 318/254 |

*Primary Examiner*—G. R. Simmons
*Attorney*—Robert E. Burns and Emmanuel J. Lobato

[57] ABSTRACT

An electronically commutated polyphase motor operating from a direct current supply is provided with means for avoiding excessive short circuit current being produced in the motor windings by reactive voltage induced in the windings, for example under light load conditions. Transistors in the commutating circuit are thereby protected from overload. Further safety means prevents malfunction caused by reactive voltage induced in inductive coupling between the commutating circuit and a control circuit.

12 Claims, 5 Drawing Figures

COMMUTATED MOTOR INCLUDING COMMUTATION MEANS RESPONSIVE TO REACTIVE VOLTAGE INDUCED IN ARMATURE WINDINGS

This is a continuation-in-part application of my application Ser. No. 682,176 filed Nov. 13, 1967 now abandoned.

Various types of motors with electronic commutation applied directly to the phase windings are already known.

In a known type of three phase motor with electronic commutation of the motor windings there has been a problem that under some conditions, for example under light load, the voltage induced in the motor windings may be out of phase with the voltage applied by the commutating means and may result in high currents producing strong braking of the motor, causing heating of the windings and possibly destroying circuit components. The present invention seeks to overcome these disadvantages.

In accordance with the invention, means is provided for sensing excessive reactive voltage induced in the motor windings and for controlling the commutating circuit of the motor to avoid excessive current produced by induced voltage that might otherwise damage the motor windings or the commutating circuit.

In a preferred embodiment in which the commutating circuit is inductively coupled with a control circuit, protective means in accordance with the invention avoids malfunction of the commutation circuit and possible damage of components by excessive reactive voltage induced in the inductive coupling between the commutating circuit and the control circuit.

The invention will be better understood by referring to the description and embodiments thereof described by way of non-limiting example in connection with the accompanying drawings, in which.

Figure 1:
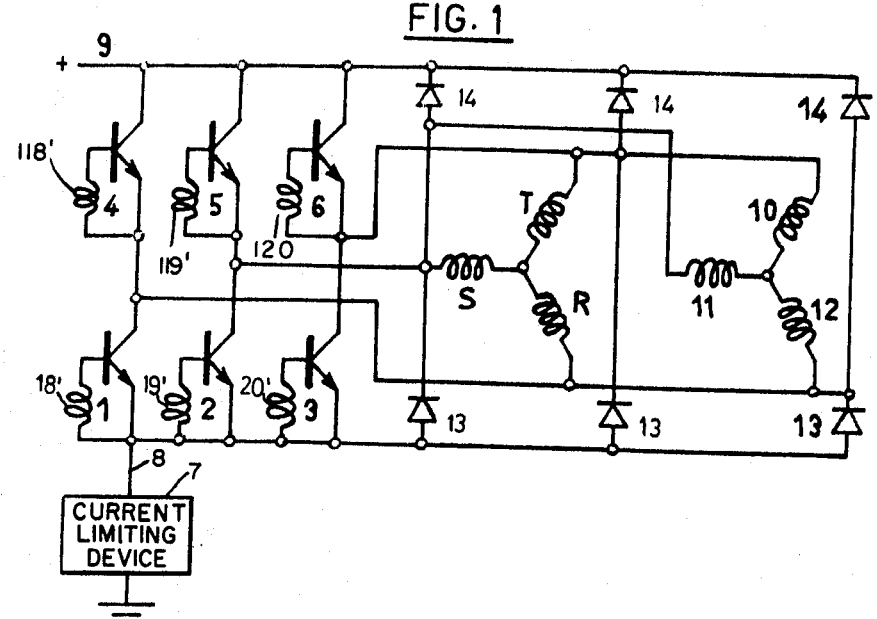
FIG. 1 shows schematically a motor with electronic commutation provided with a transformer for sensing induced voltage in the motor windings.

Omitting windings 10, 11 and 12, FIG. 1 shows schematically a type of the three phase motor with electronic communication. R, S and T are the phase windings of the motor which are successively commutated by commutation transistors 1 to 6. Generally, only one of transistors 1 to 3, connected with the negative pole 8 of a source of direct current supply and only one of transistors 4 to 6, connected with the positive pole 9 of the source of supply, are simultaneously conductive. The commutation of the transistors 4 to 6 alternate with that of the transistors 1 to 3, the electrical commutation angle of each of them being normally 120°. The commutation current preferably is limited by a device 7 which has a high dynamic impedance and small losses. Diodes 13 and 14 limit the self induced voltage during blocking of the commutation of one winding.

If the commutation of one winding is in phase with the induced voltage under full load conditions, it is known that the same is not generally true in the absence of the load. This phenomena presents two disadvantages: it results on the one hand in the maintenance of a high reactive current under no load conditions with consequent losses in and heating of the motor and, on the other hand, can cause the short circuiting of the induced voltage through a commutation element. Let us assume, for example, that winding S is commutated toward the negative pole 8 by transistor 2. Dephasing between commutation and induced voltage can have as a result that the voltage of phase winding R becomes more negative than that of phase winding S before the commutation of the latter is interrupted. There than occurs a short circuiting of the induced voltage through the path R—S—2—13 with a strong braking of the motor, the torque of which is strongly modulated, heating of the winding and possibly the destruction of transistor 2. It is an object of the present invention to eliminate these disadvantages.

While FIG. 1 shows the circuit of a three phase motor having phase windings R, S and T, commutated by transistors 1 to 6, these can be replaced by other commutation elements, for example, thyristors with a suitable modification of the circuit.

Diodes 13 and 14 which limit the self induction voltages generated in windings R, S and T during blocking of their respective commutation, can be replaced by other elements, such as condensers, preferably in series with small damping resistances.

In accordance with the invention as shown in FIG. 1, voltages induced in phase windings R, S and T are here sensed by a three phase transformer having primaries 12, 11 and 10 inductively coupled with or connected in parallel with the motor windings.

Figure 2:
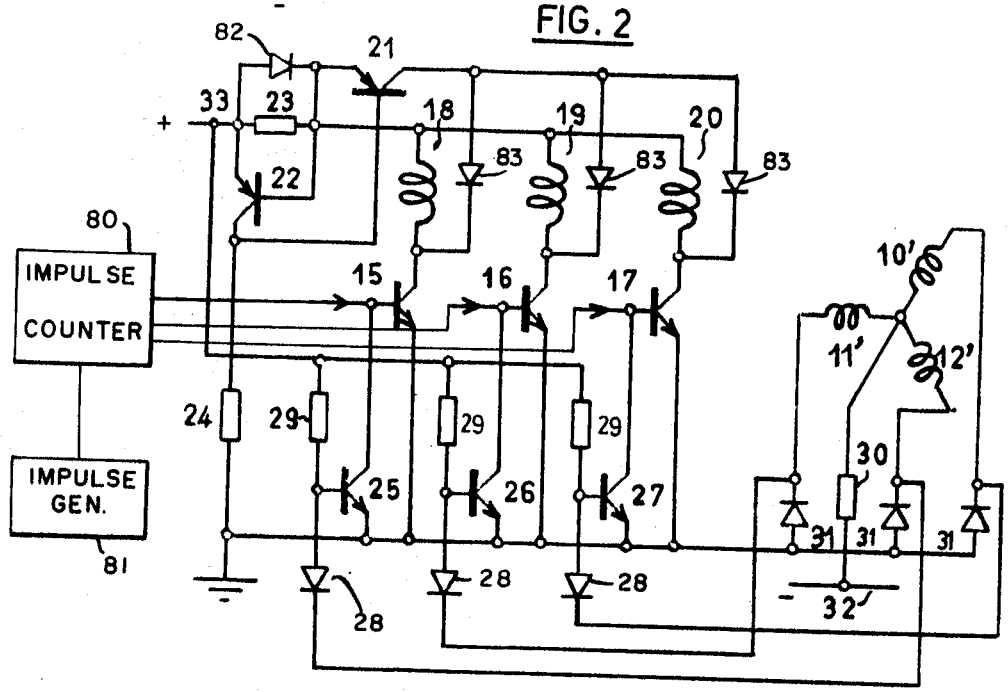
FIG. 2 shows schematically a control circuit for the commutating circuit of the motor of FIG. 1.

A control circuit for the group of transistors 1 to 3 is shown schematically in FIG. 2. The respective input windings 18', 19' and 20' of these three transistors are the secondaries of a three phase transformer the primaries of which are shown at 18, 19 and 20 and which are able to be commutated by transistors 15, 16 and 17. The conductivity of transistors 15, 16 and 17 generally ensures that of the corresponding transistors 1, 2 and 3 respectively. Owing to the three phase structure of this energizing transformer, it will be noted that the conductivity of one of the power transistors 1, 2 or 3 ensures a reverse blocking voltage on the bases of the other two. The nominal electric commutation angle of each of them being of 120°, there is normally always one transistor of this group, and only one, that is conductive. The cyclical unblocking of transistors 15, 16 and 17 is controlled by voltages applied on their respective bases from a pilot circuit constituted generally by an electronic impulse counter 80 operating in a closed circuit and fed by an impulse generator 81. Pulses from the impulse generator 81 are routed successively to transistor 15, 16 and 17 by the impulse counter 80.

When the motor is under a heavy load, the induced voltage in windings R, S and T of the motor (FIG. 1) is in phase with the current and therefore with the commutations. In the opposite case when the motor is under a light load, there occurs a phenomena indicated by the following example: let us assume that phase S is commutated by transistor 2, the dephasing generated between the induced voltage and the commutations under a light load of the motor evidences itself by the fact that the induced voltage generated in winding R becomes more negative than the voltage of winding S while the transistor 2 is still conductive. There follows a short circuiting of the induced voltage along the path R—S—2—13 (FIG. 1). Such a short circuit can destroy transistor 2 and in any event will heat the winding, introduce a strong modulation of the motor torque and reduce the output.

To avoid this short circuit, the conduction of transistors 15 to 17 is subordinated to the blocking of transistors 25 to 27, as shows FIG. 2. Windings 10', 11' and 12' are the secondaries of a transformer having primaries 10, 11 and 12 and are inductively coupled with the motor windings R, S and T so as to reproduce the voltages induced in the windings of the motor. The center of the star formed by the secondary windings is subjected to a negative potential transmitted by the resistance 30 from a negative voltage supply 32 in such a way that the respective diodes 31 successively give an output as long as the corresponding phase is the most negative of the three.

Taking again the example cited above, let us assume that R becomes more negative than S. Then 12' is more negative than 11' and conversely 11' is more positive than 12'. A control current normally flows from the positive terminal 33 of an auxilliary power source through resistances 29, diodes 28, windings 10', 11' and 12' and resistance 30 to the negative terminal 32. The voltage drop across resistances 29 is such that transistors 25, 26 and 27 are normally biased to cut off.

However, when winding 11' becomes more positive, this more positive potential is applied through the middle diode 28 to the base of transistor 26 to cause this transistor to become conductive whereupon transistor 16 and therefore transistor 2 become blocked, avoiding in this manner the short circuit mentioned above. In other words, transistors 15, 16 or 17 can only be conductive if they correspond to that phase R, S or T which is momentarily the most negative.

The premature blocking of the transistor 16 can generate a variation of flux in the energizing transformer 19, 19' having a direction such as to cause the unblocking of transistor 1 to 3. To avoid this possible result, there has been provided a locking circuit constituted by transistors 21 and 22. A resistance 23 is connected in series between the positive voltage supply 33 and one end of each of the transformer primaries 18, 19 and 20, the other ends of which are connected respectively with the collectors of transistors 15, 16 and 17. The emitter of the transistor 22 is connected to the positive voltage supply 33 at one end of the resistance 23 while the base is connected at the other end of resistance 23. The collector of transistor 22 is connected through a resistance 24 to ground. The base of the transistor 21 is connected to the collector of transistor 22 while the emitters of transistor 21 and 22 are connected with one another through a diode 82 connected in parallel with the resistance 23. When one of the transistors 15 to 17 is conductive, the voltage drop in resistance 23 makes transistor 22 conductive which blocks locking transistor 21. If, on the contrary, all of the transistors 15 to 17 are blocked, transistor 22 is also blocked while transistor 21 becomes conductive. This provides a discharge path through the emitter-collector circuit of transistor 21 and one of the diodes 83 to dissipate any reaction voltage that may be induced in any of the primaries 18, 19 or 20 when all of the transistors 15, 16 and 17 are blocked, for example through the action of the transistors 25, 26 and 27 as described above. Premature unblocking of transistors 1–3 is thereby avoided.

The control of the group of transistors 4 to 6 (FIG. 1) is effected by a circuit identical to that of FIG. 2, the only difference being in the inversion of the windings of a second secondary, similar to 10', 11' and 12', in such a way as to make possible the commutation of the most positive phase instead of the most negative phase. Thus the commutating transistors 4, 5 and 6 are controlled by a three phase transformer having secondaries 118', 119' and 120' corresponding respectively with the secondaries 18', 19' and 20' of the transformer controlling commutating transistors 1, 2 and 3. The transformers controlling the transistors 1, 2 and 3 and the transistors 4, 5 and 6 are interconnected to provide the proper phase relationship in the commutation of the motor windings. Alternatively, all of the transistors are controlled by a single transformer having six secondary windings. In like manner, the control circuit for transistors 1–3 comprising the impulse generator 81 and impulse counter 80 is interconnected with or integrated with a like control circuit for transistors 4–6 to provide proper synchronization of the commutation of the motor windings.

As above described, the cyclical commutation of the motor windings R, S and T is controlled by a pilot circuit generally constituted as already said by a closed circuit electronic impulse counter 80 fed by an impulse generator 81. However, control of the commutating transistors is made dependent, in a certain measure, on the voltage induced in windings R, S and T of the motor which is sensed by the transformer windings 10, 11 and 12 and acts through the transistors 25, 26 and 27 as described to reduce the electrical angle nominally of 120° for each commutation in the event the induced voltage in a non-commutated winding exceeds the voltage in a commutated winding. From this there result several advantages including the absence of short circuits in the induced voltage, reduction of the heat and therefore improvement in efficiency, a lesser modulation of the motor torque, etc.

Figure 3:
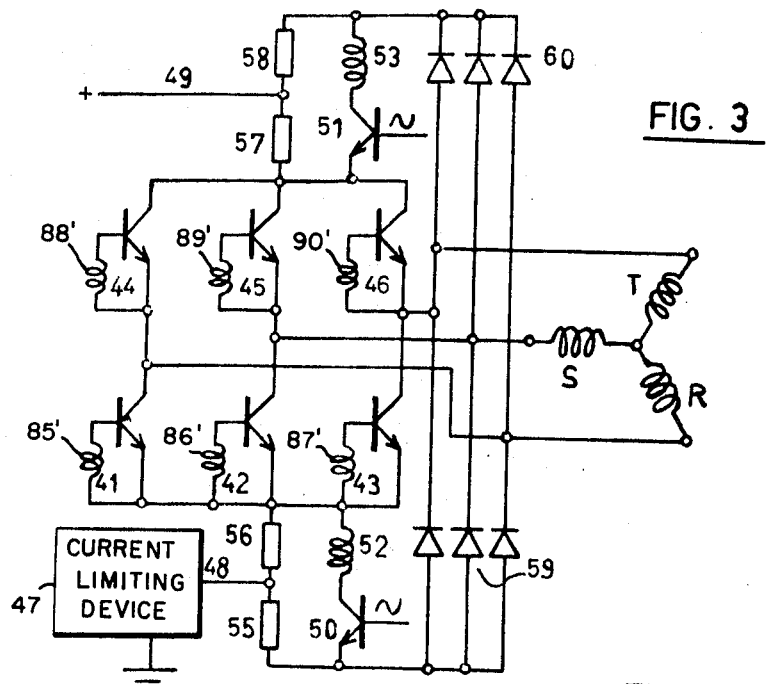
FIG. 3 shows schematically a three phase motor and its commutation circuit.

The circuit diagram of FIG. 3 shows the three phases R, S and T of a three phase motor and the commutation circuits for transistors 41 to 43 and 44 to 46 of which only one of each group is conductive at a given time. Diodes 59 and 60 lop off the self induction voltages generated during the above blocking of a commutation element, avoid the inversion of voltage on the commutation transistors and conduct the short circuit current generated under the circumstances mentioned above. This short circuit current is measured on one hand by resistances 55 and 56 on the other hand by resistances 57 and 58 according to whether the short circuiting sequence refers to one of the other group of transistors 41 to 43 or 44 to 46. So called "restitution" currents pass through resistance 55 while so called commutation currents pass through resistance 56. These currents can occur separately but they are simultaneous in the case of the short circuits of interest wherefrom the interest in dividing the parametric measuring resistance of the short circuit current in order to eliminate the individual effects of the restitution and commutation currents in favor of the simultaneous currents generated during the short circuits.

The parametric voltage generated by the short circuit current through resistances 55 and 56, or through resistances 57 and 58, are transferred at a selected level to the control circuit described below by a high frequency cutting system comprising transistors 50 and 51 and by transformers having primaries 52 and 53. The transistors 50 and 51, energized by a high frequency pulsed current applied to their bases, commutate for this purpose the parametric voltage in the transformers primaries 52 and 53.

The feeding of the motor commutation system is provided between direct current supply lines 48 and 49 in series with a device 47 which corresponds to device 7 in FIG. 1 and is intended to limit the current.

It should be noted that the commutation of the power transistors is here effected by transformers. A first three phase transformer having secondaries 85', 86' and 87' controls transistors of group 41 to 43 while a second three phase transformer having secondaries 88', 89' and 90' controls transistors of group 44 to 46. The windings placed in the base circuit of transistors 41 to 46 constitute the secondaries of the said three phase transformers.

Figure 4:
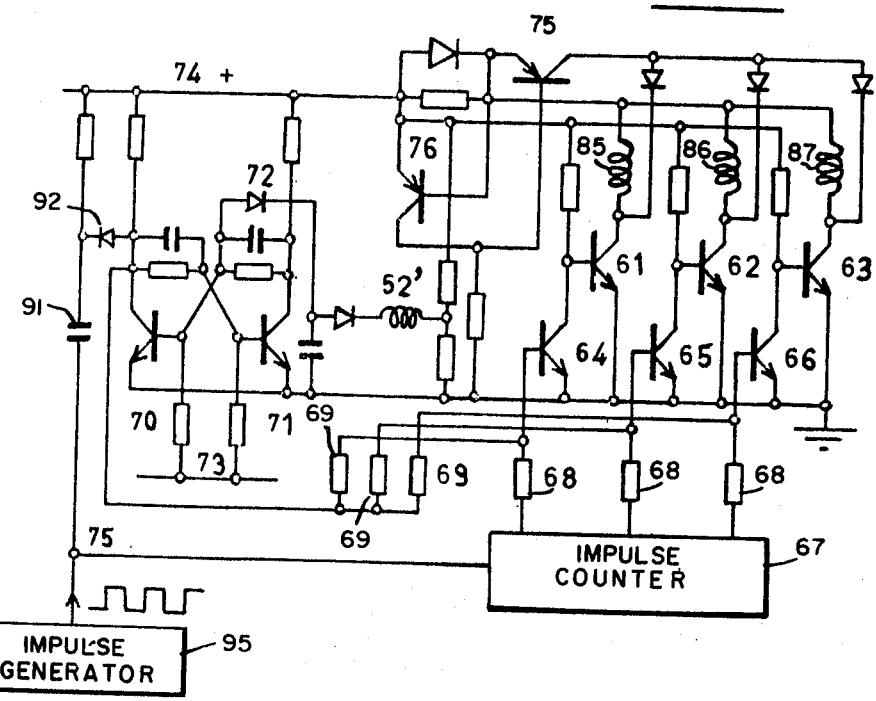
FIG. 4 shows schematically a control circuit for the motor commutation circuit of FIG. 3.

FIG. 4 relates more particularly to the mode of control and a servo technique according to the invention. The circuit shown in FIG. 4 is concerned only with the group of transistors 41 to 43 of FIG. 3. The pilot circuit of the group of transistors 44 to 46 is identical thereto.

Transistors 61, 62 and 63 constitute the commutation paths of the primaries 85, 86 and 87 of the transformer, the secondaries 85', 86' and 87' of which control respectively transistors 41, 42 and 43 of FIG. 3. When transistor 61 is conductive, corresponding transistor 41 is conductive. The same is true of transistors 62 and 63 and corresponding transistors 42 and 43 respectively.

The simultaneous blocking of transistors 61 to 63 necessarily causes a simultaneous blocking of transistors 41 to 43 due to the locking system comprising transistors 75 and 76 which correspond to transistors 21 and 22 of FIG. 2 previously described. The conductivity of the transistors 61, 62 and 63 is controlled by transistors 64, 65 and 66 respectively. When any of transistors 64 to 66 is blocked, the corresponding one of transistor 61 to 63 is conductive. Only one of transistors 64 to 66 must be blocked at any one time and this occurs in a cyclical order ensured by a closed circuit impulse counter shown schematically by block 67 fed by pilot impulses from an impulse generator 95.

The conductivity of transistors 64 to 66 is however still subordinated to the state of a bistable circuit constituted by transistors 70 and 71. When transistor 70 is conductive, the bistable circuit has no influence on the state of blocking or conductivity of transistors 64 to 66. If, on the contrary, transistor 70 is non-conductive, then transistors 64 to 66 will be all conductive, their bases being polarized by a current through resistances 69, and commutation transistors 41 to 43 of FIG. 3 are then all non-conductive.

The bistable circuit is thus characterized by two states. One, "passive" corresponds to the conductivity of transistor 70, the other "active" corresponds to the non-conductivity of transistor 70. The pilot impulses from the pulse generator 95 which control the permutations of sequences of commutation by impulse counter 67 and resistances 68 also act through a capacitor 91 and diode 92 on the bistable circuit which they invariably bring back to the conductive state of transistor 70 ("passive" state). However, the parametric voltage transmitted from the transformer primary 52 of FIG. 3 to the secondary 52 of FIG. 4 tends, after detection and through a diode 72, to cause the bistable circuit to switch over into its "active" state (transistor 70 non-conductive) as soon as the parametric voltage exceeds a given threshold value, which is reached only when a short circuit current manifests itself with a sufficient intensity. All the commutation paths controlled by the bistable circuit (transistors 41 to 43 of FIG. 3) are then simultaneously made non-conductive until the arrival of the following pilot impulse which reestablishes the passive state of the bistable circuit (conductivity of transistor 70) and controls the following commutation sequence through the impulse counter 67.

In summary, a short circuit current having an intensity greater than the tolerated limit generates through the bistable circuit the blocking of the commutation responsible for this short circuit current until the next following commutation sequence.

The control circuit of FIG. 4 is fed by auxiliary DC voltages 73 (negative) and 74 (positive) from a suitable power supply.

This circuit has over the one previously described, the advantage of permitting a short circuit current so long as it does not exceed a certain intensity. This permits a powerful electric braking of the motor during speed reduction effected, for example by the reduction of the pilot frequency provided by the impulse generator 95.

When the feed is obtained from a rectifier, the electrical energy recovered during lowering of the pilot frequency tends to generate an over voltage which can be avoided by a circuit for lopping off the excess voltage.

Figure 5:
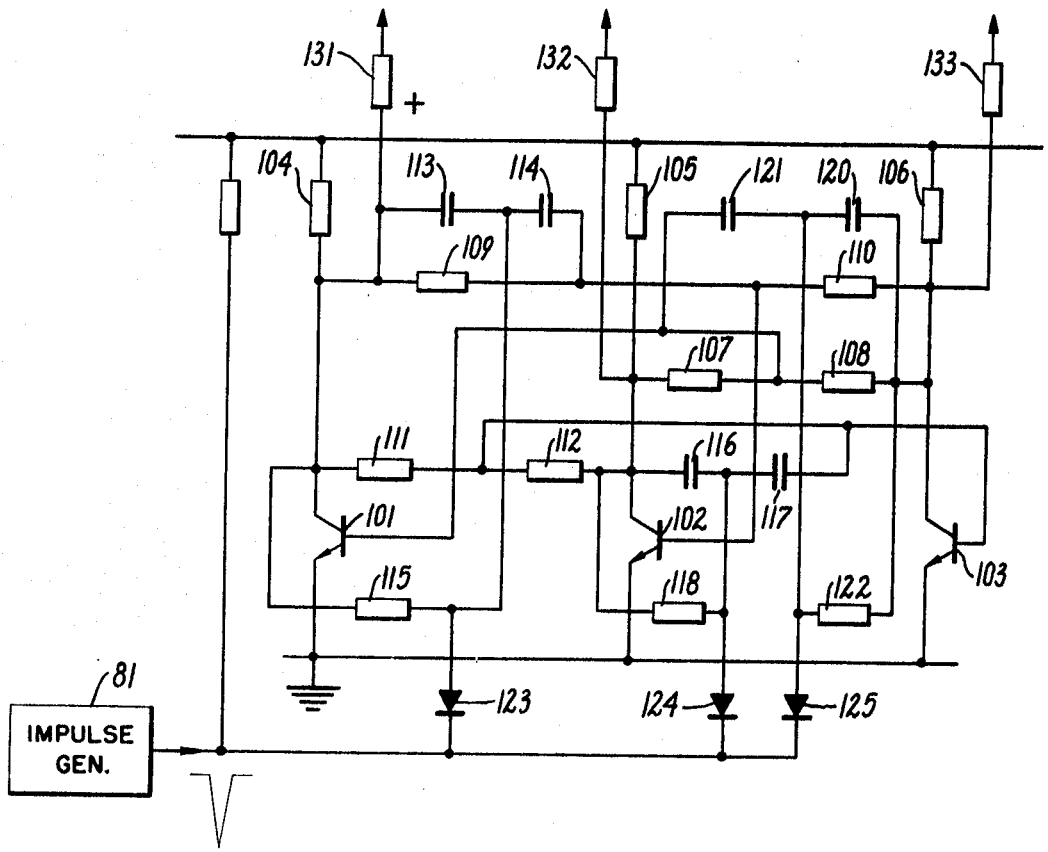
FIG. 5 shows schematically an impulse counter. commutation.

A suitable closed circuit impulse counter for controlling and timing the commutation of the motor windings is illustrated schematically by way of example in FIG. 5. This circuit receives impulses from a pulse generator and has the function of distributing (and shaping) the impulses cyclically to the three control units for the three phases of the motor and is shown as a ring counter circuit having three outputs. The circuit shown in FIG. 5 corresponds to the impulse counter 80 shown in FIG. 2 and the impulse counter 67 shown in FIG. 4.

The circuit shown in FIG. 5 comprises three transistors 101, 102 and 103 which are coupled with one another in a closed ring. The emitters of the transistors are connected to ground while the collectors are connected to the positive terminal of a DC power supply through resistances 104, 105 and 106 respectively. The base of each transistor is connected through a resistance to the collector of each of the other two transistors. Thus, the base of transistor 101 is connected through a resistance 107 to the collector of transistor 102 and through a resistance 108 with the collector of transistor 103. The base of transistor 102 is connected through a resistance 109 with the collector of transistor 101 and through a resistance 110 with the collector of transistor 103. The base of transistor 103 is connected through a resistance 111 with the collector of transistor 101 and through a resistance 112 with the collector of transistor 102. As a result, one transistor is blocked if the two other transistors are simultaneously conductive. Hence, the circuit has three distinct stable states corresponding respectively to each of the transistors being blocked, the other two being conductive.

The permutation from one stable state to the next is possible in principle by the capacitive connection of the collector of each transistor to the base of the following one. In order to improve the selectivity of the impulses of permutation, the capacitive coupling is herein shown as comprising two capacitors in series, the middle point being connected through a resistance to the collector of the preceding transistor. Thus, the collector of transistor 101 is connected through capacitors 113 and 114 with the base of transistor 102, the midpoint between the two capacitors being connected through a resistance 115 to the collector of transistor 101. Similarly, the collector of transistor 102 is connected through capacitors 116 and 117 with the base of transistor 103 while the midpoint between the capacitors is connected through a resistance 118 to the collector of transistor 102. In the like manner, the collector of transistor 103 is connected through capacitors 120 and 121 with the base of transistor 101 while the midpoint between the capacitors is connected through a resistance 122 to the collector of transistor 103.

Permutation between the stable states of the circuit is effected by applying negative pulses from the impulse generator 81 through diodes 123, 124 and 125 respectively to the midpoints between the pairs of series connected capacitors connecting the collector of each transistor with the base of the succeeding transistor as described above. Under the conditions of polarization resulting from the described connections, only the condenser coupled to the base of the transistor which must be blocked by the following input impulse is capable of receiving this impulse to effect permutation from one state to the next. Assuming, for example that transistor 101 is blocked and transistors 102 and 103 are conductive, the two resistances 107 and 108 do not transmit any polarization current to the base of transistor 101 while the two resistances 109 and 111 which connect the collector of transistor 101 to the bases of transistors 102 and 103 respectively transmit polarization current to the bases of the latter transistors so as to make them conductive. Owing to the resistance 115, only the polarization current from the midpoint between the pair of capacitors 113 and 114 is positive. Hence, only this pair of capacitors will receive the next negative impulse transmitted by the diode 123 and from there to the base of the transistor 102 with the result that transistor 102 is blocked. Permutation of successive states is effected in like manner.

The collectors of the transistors 101, 102 and 103 are connected respectively through resistances 131, 132 and 133 to the inputs of the control transistors 15, 16 and 17 as shown in FIG. 2 so as to provide cyclical control of these transistors and hence of the commutating transistors 1, 2 and 3 shown in FIG. 1. Commutation of the circuits shown in FIGS. 3 and 4 is effected in like manner. While the circuit shown in FIG. 5 is suitable for the purpose, it will be understood that other ring counter circuits may be used for cyclically distributing and shaping the periodic pulses received from the impulse generator to effect commutation of the motor circuit.

I claim:

1. In an electronically commutated motor having three phase windings, a commutating and control circuit comprising direct current supply means, commutating switching means for selectively connecting said phase windings with said supply means to energize said windings, control circuit means for controlling said commutating switching means, said control circuit means comprising means for generating control pulses at a selected frequency and means controlled by said pulses for controlling commutating switching means to render said switching means selectively and sequentially conductive to energize the respective phase windings cyclically at a selected rate, means for sensing reactive voltage induced in each of said phase windings and blocking means connected with and controlled by said sensing means in response to excessive induced voltage in a non-selected non-energizing winding for actuating said control circuit means to render the respective switching means of the selected energized phase winding non-conductive and thereby avoid excessive short circuit current being produced in said windings by said induced voltage, said sensing means comprising a transformer having a primary in which a voltage is induced by the presence of an excessive reactive voltage in said non-selected winding and a secondary connected with and applying a voltage to said blocking means on the occurrence of said excessive voltage.

2. A motor according to claim 1, wherein said transformer is a three phase transformer having primary windings inductively coupled with respective ones of said phase windings for developing induced voltages therein proportional to voltages induced in said phase windings.

3. A motor according to claim 2, wherein said blocking means comprises a blocking switching means overriding the control of said commutating switching means by said control circuit means to render said commutating switching means non-conductive in the event of excessive induced voltage in a non-selected phase winding, said blocking switching means being coupled with and controlled by said secondary windings of said transformer.

4. A motor according to claim 1, further including protective means for preventing the premature opening of the commutating switching means of non-selected phase windings during operation of said blocking means.

5. A motor according to claim 4, wherein said commutating switching means comprises power switching means, control switching means and control transformer means having primaries coupled with said control switching means and secondaries controlling said power switching means, said protective means comprising means for dissipating any excessive voltage induced in said control transformer when all of said control switching means are simultaneously non-conductive.

6. In an electronically commutated motor having a plurality of phase windings, a commutating and control circuit comprising direct current supply means having positive and negative poles, commutating switching means comprising individual switching means for connecting each said phase winding with said supply means to energize the respective winding, control circuit means controlling said commutating switching means to render said switching means selectively and sequentially conductive to energize the respective phase winding cyclically at a selected rate, said control circuit means comprising means for generating control pulses at a selected frequency and means controlled by said pulses for controlling commutating switching means and circuit protecting means comprising blocking means, means for measuring short circuit current occurring in said motor windings by reason of voltage induced in said windings, and means responsive to excessive short circuit current for actuating said blocking means to interrupt said excessive short circuit current, said means for measuring the short circuit current comprises a resistance divided into two parts, one part thereof being traversed by a commutation current and the other part thereof being traversed by an induced current, said two currents occurring simultaneously during the short circuiting of the voltage induced in the windings of said motor and means responsive to the voltage drops across said resistance parts.

7. A motor according to claim 6, wherein said circuit protecting means includes a transformer having a primary and a secondary, said primary and a high frequency chopper being connected in series across said resistance and said secondary controlling said blocking means.

8. A motor according to claim 6, wherein said circuit protecting means comprises two like parts, one controlling those individual switching means for connecting said phase windings with said positive pole and the other controlling those individual switching means for connecting said phase windings with said negative pole.

9. A motor according to claim 6, wherein said blocking means comprises a bistable circuit which is activated to blocking condition by said excessive short circuit current and is reset to non-blocking condition by each recurring said pulse.

10. In an electronically commutated motor having a plurality of phase windings, a commutating and control circuit comprising direct current supply means having positive and negative poles, commutating switching means comprising individual switching means for connecting each said phase winding selectively with said positive and negative poles to energize said windings, said switching means being controllable by application of electrical pulses thereto, control circuit means for controlling said commutating switching means to render said switching means selectively and sequentially conductive to energize respective phase windings cyclically at a selected rate, said control circuit means including pulse generating means for generating pulses at a selected rate and means for distributing said pulses cyclically to said commutating switching means to control said commutating switching means, and circuit protecting means comprising means for sensing short circuit current occurring in said phase windings by reason of reactive voltage induced in said windings, and blocking means responsive to excessive induced short circuit current in said phase windings for blocking said commutating switching means to render said commutating switching means non-conductive and thereby open the circuit of said short circuit current, said sensing means comprising a transformer having a primary in which a voltage is produced by excessive short circuit current in said phase windings and a secondary connected with and applying a voltage to said blocking means on the occurrence of such excessive short circuit current.

11. A motor according to claim 10, comprising means for preventing premature opening of the commutating switching means of non-selected phase windings in the event of operation of said blocking means.

12. A motor according to claim 11, in which said commutating switching means comprises commutating transistors, control transistors and transformer means coupling said commutating transistors with said control transistors so that the conduction of said commutating transistors is controlled by the conduction of corresponding said control transistors, and in which said means for preventing premature opening of the commutating switching means of non-selected phase windings comprises means for dissipating excess voltage induced in said transformer means opon operation of said blocking means.

* * * * *